United States Patent
Van Duynhoven

(12) 
(10) Patent No.: US 6,359,048 B1
(45) Date of Patent: Mar. 19, 2002

(54) TINTABLE LUMINESCENT PAINT

(76) Inventor: Debra May Van Duynhoven, 95 Seward St., San Francisco, CA (US) 94114

( * ) Notice: Subject to any disclaimer, the term of this patent is extended or adjusted under 35 U.S.C. 154(b) by 0 days.

(21) Appl. No.: 09/584,486

(22) Filed: Jun. 1, 2000

Related U.S. Application Data

(60) Provisional application No. 60/138,025, filed on Jun. 8, 1999, and provisional application No. 60/168,647, filed on Dec. 3, 1999.

(51) Int. Cl.[7] .......................... C08K 5/04; C08K 3/10; C08K 3/22; C08L 67/00; C09K 11/02

(52) U.S. Cl. ................... 524/400; 524/436; 524/437; 524/497; 524/601; 252/301.35

(58) Field of Search ................. 524/400, 436, 524/437, 497, 601; 523/172; 252/301.4 R, 301.35; 427/157, 158

(56) References Cited

U.S. PATENT DOCUMENTS

| | | | | |
|---|---|---|---|---|
| 4,025,476 A | * | 5/1977 | Miller et al. ................. | 523/172 |
| 4,344,909 A | * | 8/1982 | De Blauwe ................. | 264/230 |
| 5,424,006 A | * | 6/1995 | Murayama et al. ... | 252/301.4 R |
| 5,665,793 A | * | 9/1997 | Anders ........................ | 523/172 |
| 5,853,621 A | * | 12/1998 | Miller et al. ................. | 252/500 |
| 5,885,483 A | * | 3/1999 | Hao et al. ............. | 252/301.4 R |
| 5,985,987 A | * | 11/1999 | Adolfsson et al. .......... | 524/593 |
| 5,998,525 A | * | 12/1999 | Wang et al. ................. | 524/425 |
| 6,075,088 A | * | 6/2000 | Braeken ..................... | 524/590 |

FOREIGN PATENT DOCUMENTS

| EP | 253543 | * | 1/1988 |
|---|---|---|---|

\* cited by examiner

*Primary Examiner*—Vasu Jagannathan
*Assistant Examiner*—Callie E. Shosho

(57) ABSTRACT

By combining alkali earth oxide aluminate phosphors with an alkyd base, a rheology improver, another pigment, an anti-skin additive, and other ingredients, one can achieve a luminescent paint that has characteristics including tintability, applicability, viscosity, appearance and coloration comparable to a non-luminescent paint, with adequate protection from moisture and at a relatively reasonable cost. An alkyd base formulation is the preferred formulation that will allow for the highest amount of loading without compromising the quality of the paint with respect to appearance or applicability. The appearance of the paint in daylight has minimal orange peel or pockmark affects because of the ability of this formulation to suspend and diffuse the large luminescent particles effectively while applying the product. In addition because of the effectiveness of this formulation the appearance of the glow is even, consistent and undisrupted in a properly installed scenario. This product is non-abrasive and will provide a smooth, even appearance.

11 Claims, No Drawings

TINTABLE LUMINESCENT PAINT

This Application claims benefit of Provisional No. 60/138,025 filed Jun. 8, 1999 and No. 60/168,647 filed Dec. 3, 1999.

BACKGROUND—FIELD OF THE INVENTION

This invention relates to a novel composition of luminescent paint useful for example, in lighting interior spaces, material surfaces and objects. The luminescent paint may be exposed to light, either natural or artificial, for a specific minimum amount of time, before giving off light for a specific and measurable amount of time and level of luminosity. The base color of the luminescent paint can be tinted with readily available paint tints in certain range of light colors. The luminescent paint has about the quality and characteristics of standard paint with respect to applicability, appearance (orange peel), durability, and method of use.

This tintable luminescent paint has interior applications whereby the painted surface can act as a way—finding devise in a scenario where no other light is available. Specific application methods can provide sufficient light, comparable to emergency lighting devises, in corridors, exist stairs, etc.

BACKGROUND—DESCRIPTION OF PRIOR ART

Luminous products have been manufactured for many years although most products have been in an extruded plastic form or from coating the product in a manufacturing environment. Originally luminous products were more intended as a trinket, toy or novelty item.

As phosphorescent phosphors, sulfide phosphorescent phosphors are known Examples of sulfide phosphorescent phosphors include CaS:Bi (which emits light of violet blue), CaStS:Bi (which emits light of blue), ZnS:Cu (which emits light of green) and ZnCdS:Cu (which emits light or yellow or orange). However, any of these sulfide phosphorescent phosphors is chemically unstable and can suffer from degraded light resistance.

Another known type of phosphor is available under the trademark LUMINOVA (described in U.S. Pat. No. 5,424,006). This type of phosphor is an alkali earth (strontium, barium, calcium) oxide aluminate, and can also include rare earth elements. It has the advantage of being relatively bright in color, and shows excellent phosphorescence. It has the serious disadvantages of being sensitive to moisture, and being relatively dense and so difficult to mix.

U.S. Pat. No. 5,874,491 relates to phosphorescent highway paint incorporating this type of phosphor. The inventor found that the mixing of the phosphor in a water soluble polyurethane, or an epoxy, paint composition, provided a relatively stable composition useful in marking road surfaces. The mixture of the luminescent substance with a water-soluble polyurethane or epoxy resin agglomerates or encapsulates the pigment. These could be mixed with water-based highway paints. Unfortunately, such resins are expensive and unsuitable for applications where it is desired to have a normal-looking, durable and cost effective painted surface. Encapsulation of the phosphor also increases the effective particle size of the phosphor, and makes it difficult to incorporate a substantial amount of the phosphor into a paint thereby reducing the amount it can glow, in addition to the typical characteristics of the product, and making it difficult to use. The paint disclosed would not be suitable for interior walls, and would not apply as easily as normal paint.

The product of this invention is durable enough to be used on exterior surfaces, but tests on this and other formulations (such as U.S. Pat. Nos. 6,005,024 and 5,874,491 by Anders) show that exterior applications are not effective because of the natural dimming of sunlight and other ambient light which in most cases in unpreventable. The first, natural dimming of sunlight affects the applied surface in a number of ways. The surface will absorb the UV radiation and will glow but it will glow as the sun goes down and sunlight dims. Unless the product is very heavily pigmented the glow will have diminished before complete darkness occurs. In addition, if any transitory ambient or direct light (like headlights) shone on the luminescent surface, it will be undistinguishable from the area around it, thereby discounting the product's luminescent quality.

Our tests have show the Luminova™ pigment adds yellow coloration to any formula in which it is used at a ratio of higher than 5%. The clear type products such as the epoxy system for road ways/highways, airport runways, traffic control surface markings described in U.S. Pat. No. 6,005,024 would be difficult to produce as a clear overlay at that ratio. In addition the two step epoxy system is limiting because of its application (i.e. it must be completely used immediately after mixing the two components). Luminescent epoxy products have been available for many years.

Water based compositions have been devised using a zinc sulfide pigment, although it is limiting in its application as it must be used after opening because the luminescent particles may lose their ability to glow if left unattended.

Alternative emergency way-finding devises are increasingly more important and are described in U.S. Pat. Nos. 5,904,017 and 4,522,861, where accessories or attachments can provide luminosity to emergency escape paths and stair treads. These accessories are generally very awkward to install, unpleasant from a design perspective and require special tools or machinery to install.

Prior patents (Anders' U.S. Pat. No. 5,874,491) claim that their product can be produced in various colors including white (using titanium dioxide), yellow (chrome yellow), orange, blue and green It has been our experience that the addition of great amounts of pigments masks the luminosity levels as the additional particle covers the luminescent particles. The luminescent pigment, such as LUMINOVA™ pigment has a natural yellow colour that does not change greatly with the addition of titanium dioxide. If the pigment is dark it absorbs the light and produces less of a glow. Our formulation has a base tone that can be tinted with a specific range of light tints as per the process which regular paint is pigmented.

SUMMARY

I have found that by combining LUMINOVA phosphors with an alkyd base, a rheology improver, another pigment, an anti-skin additive, and other ingredients, I can achieve a luminescent paint that has characteristics including tintability, applicability, viscosity, appearance and coloration comparable to a non-luminescent paint, with adequate protection from moisture and at a relatively reasonable cost.

An alkyd base formulation is the preferred formulation that will allow for the highest amount of loading without compromising the quality of the paint with respect to appearance or applicability. The appearance of the paint in daylight has minimal orange peel or pockmark affects because of the ability for this formulation to suspend and diffuse the large luminescent particles effectively while applying the product. In many other products unattractive daylight appearance is a limiting factors. In addition because of the effectiveness of this formulation the appearance of the glow is even, consistent and undisrupted in a properly installed scenario. This product is non abrasive and will provide a smooth, even appearance.

DESCRIPTION

The paint of this invention comprises an oil base resin, that is, an alkyd resin system, or a polyurethane, and phosphorescent pigment, such as LUMINOVA™ pigment.

At least one other pigment is added as well, preferably titanium dioxide, as a brightener. The addition of titanium dioxide provides a compromise between initial afterglow brightness and hiding. The increase in titanium dioxide improves the whiteness of the luminescent paint but results in a loss of afterglow brightness. Titanium dioxide and other pigments can inhibit both the absorption and dissipation of the luminescence. It has been found that the preferable formulation includes only 1–2% of titanium dioxide, which is low for paint. Minimizing the amount of titanium dioxide allows for the addition of small amounts of light colored tints. Tints can be added to the base paint at a ratio of 300 g to 0.1 g or 0.03%.

In general:

1. A base color that is tintable as per the process by which standard paint is tinted. The color range will include a variety of light colors, which do not mask or absorb the luminosity as some darker colors do.

2. The base product will be non-abrasive and will provide a smooth, even appearance.

3. The product is easy to manufacture and apply. The formulation does not get compromised in strength or quality depending on the amount of pigment added, assuming reasonable amounts are added. The amount of pigment added will be based on the luminosity level required and the purchase price point.

4. If one paints a (2–3 foot) band above the floor level, the product will produce enough light to aid visually in an emergency situation.

5. The tints can be added to the base paint at a ratio of 300 g to 0.1 g or 0.03%.

I have also added other ingredients, such as rheology additives, pigments, tints, and other additives, including surface tension modifiers, drying agents, and the like. The addition and ratios of various rheology modifier systems has and enormous effect on the viscosity and thixotropy of the coating. The inclusion of a large amount of the phosphor in a paint resin system is difficult to accomplish, as the phosphor is so dense, approximately twice as dense as $TiO_2$. The phosphor tends to fall out of suspension quickly.

In general, rheology modifiers, such as surfactants, modified castor oils, silicas, and the like, will be required to keep the phosphor in suspension while the paint is applied. Modified castor oil (RILANIT) is a preferred rheology modifier.

Leveling agents may also be used to aid leveling of the paint, as it tends to be thick. Likewise, drying agents, such as cobalt naphthenate, improve the drying time without deleterious effects.

The phosphorescent material comprises from about 15% to about 75% by weight of the paint, preferably between 40 and 50%: The more such material, the brighter and longer lasting the glow, but the more difficult it is to work the paint.

The treatment of the pigment is important as it cannot be ground, and it cannot be exposed to water, as it would lose it ability to glow. The LUMINOVA™ pigment, or comparable type, cannot be exposed to heavy metals in both the system and the mixing apparatus. There these limiting factors are taken into consideration in the formulation and method of manufacture described below (and conversely have not been in other products thereby reducing their effectiveness.)

My preferred formulation is as follows (all parts are by weight):

| | |
|---|---:|
| Charge a mixing vessel under a high-speed disperser fitted with a Cowles blade with: | |
| Wallkyd ® 11-029 (alkyd resin) | 14.0 |
| Start the disperser at 3,500 rpm and add: | |
| RILANIT ® SPECIAL M (rheology improver) | 0.76 |
| Disperse for 20 minutes, ensuring that the temperature reaches a minimum of 35° C. and a maximum of 45° C. | |
| Add the following and mix at high speed for 10 minutes: | |
| Wallkyd ® 11-029 (alkyd resin) | 13.41 |
| Odourless mineral spirits (thinner) | 12.57 |
| G.D.P. 824-0076 titanium white (white pigment) | 1.88 |
| Beckosol ® AX-119 (flow additive) | 1.31 |
| Allow to cool to ambient temperature, then add: | |
| 4% calcium naphthenate (drying agent) | 1.05 |
| 6% cobalt naphthenate (drying agent) | 0.15 |
| Duskin #2 (anti-skinning agent) | 0.07 |
| LumiNova ® BG-300M | 54.80 |
| | 100.00 |

This formulation produces a base product that can tinted in a standard fashion whereby standard tints which are added to base paint in stores may be used. This formulation is comparable to a medium base tint, which can be tinted to a light shade as will be specified upon product availability.

The alkyd resin Wallkyd® 11-029 was used as it is a standard type and it is manufactured by Reichold Chemicals. The odorless mineral spirits a typical no obtrusive thinner is available from Ashland Chemical Co. The titanium dioxide we used was G.D.P. 824-0076 from Creanova, although other substitutes like Kronos 2020 also seemed to work Beckosol® AX-119 is a long oil soya alkyd resin flow additive manufactured by Reichold. The drying and anti-skinning agents chosen are readily available as well as similar products may be substituted if necessary. Lumi-Nova® BG-300M is a blue glowing phosphorescent pigment that is manufactured by Nemoto & Co. in Japan and is distributed by United Mineral and Chemical Company in New Jersey. Other phosphorescent pigment can be substituted and are available from Nemoto & Co. and other manufactures and distributors.

I evaluated the effect of various applicators on the afterglow appearance. In order to evaluate the effect of different application techniques, a number of panels were coated with luminescent paint using spray application as well as various different types of paint rollers. In an attempt to evaluate the effects of roller application on the afterglow appearance, four different types of commercial paint rollers were used. The rollers evaluated were both standard and foam rollers of ¼" nap and ¾" nap. The afterglow orange peel was reduced significantly when the luminescent paint was applied at two coats with the ¼" foam roller.

The luminescent paint could be sprayed if it was first reduced 10 to 20% with odorless mineral spirits to adjust it to spray application viscosity. The reduced paint sample was then sprayed at 40 psi using a Devil bis spray gun.

The effects of reducing the phosphorescent pigment content were thus examined. Luminescent paint prepared with half the amount of phosphorescent pigment—i.e. about 25%—gave good afterglow brightness at two coats (applied ¼" foam roller). This level of pigment could be reduced further, depending on the application and on the number of coats to be applied, but a level below about 15% gives less satisfactory results. Likewise, the level of pigment could be increased, but as the pigment is expensive, and as it becomes more difficult to maintain a thin enough paint to apply, the amount of pigment will not generally exceed 75% of the paint.

When the paint dries, once it is exposed to sufficient light, it will maintain its luminosity for minutes or hours. It provides sufficient light for low-level lighting purposes.

Because tints may be added, and because it has a known paint base, it has the appearance of conventional alkyd paint, and requires no special skill to apply. It can be tinted to match existing colors, and thus have the appearance of existing, non-luminescent paint.

Luminescent paint according to this invention can be suitable for industrial or heavy usage applications use, also.

Luminescent paint for exterior, industrial or heavy usage applications was formulated based on formulation with some changes in the alkyd resin system. The preferred formulation for industrial or heavy usage luminescent paint is:

| | |
|---|---|
| Wallkyd ® 11-029 | 26.21 |
| RILANIT ® SPECIAL M | 0.73 |
| Odourless mineral spirits | 12.02 |
| G.D.P. 824-0076 titanium white | 1.80 |
| Beckosol ® AX-119 | 1.25 |
| Aroplaz ® 1272 | 4.37 |
| 4% calcium naphthenate | 1.00 |
| 6% cobalt naphthenate | 0.14 |
| Duskin #2 | 0.07 |
| LumiNova ® BG-300M | 52.41 |
| | 100.00 |

The color of the paint may be easily varied by the addition of color, non-phosphrescent pigment or tint. Provided the colored pigment or tint is not excessively dark, the paint will maintain significant luminosity despite the addition of such pigment or tint.

It is evident that the formulations could be varied without departing from the spirit of the invention.

The after glow qualities of this paint are far superior to any other phosphorescent paint product available. The strontium aluminate pigments such as Luminova, are 10 times brighter and has 10 times the afterglow characteristics (i.e. length of glow) than ZnS:Cu pigments.

I claim:

1. A luminescent base paint, comprising:
   a) an oil based resin, and
   b) a plurality of pigment comprising at least one phosphorescent pigment which is an alkali earth oxide aluminate,
   c) a rheology modifier, which keeps phosphorescent pigment in suspension for a sufficient time to apply the paint, wherein the said rheology modifier includes a modified castor oil.

2. A luminescent base paint as claimed in claim 1, where in the paint is tintable.

3. A luminescent base paint as in claimed in claim 1, in which the oil based resin is an alkyd resin.

4. A luminescent base paint as in claimed in claim 1, in which the alkali earth is strontium.

5. A tintable, luminescent paint, comprising:
   a) an oil based resin, and
   b) a plurality of pigments comprising at least one phosphorescent pigment which is an alkali earth oxide aluminate,
   c) a rheology modifier, which keeps phosphorescent pigment in suspension for a sufficient time to apply the paint, wherein the said rheology modifier includes a modified castor oil.

6. A tintable luminescent paint as in claimed in claim 5, in which the phosphorescent pigment comprises from 15 to 75% by weight of the paint.

7. A tintable luminescent paint as in claimed in claim 5, in which the phosphorescent pigment comprises from 40 to about 55% by weight of the paint.

8. A tintable luminescent paint as in claimed in claim 5, in which the oil based resin is an alkyd resin.

9. A tintable luminescent paint as in claimed in claim 5, in which the oil based resin is an alkyd resin, and the rheology modifier is a modified castor oil.

10. A tintable luminescent paint as in claimed in claim 5, in which the oil based resin is an alkyd resin, and the rheology modifier is a modified castor oil, and which further comprises an anti-skinning agent.

11. A tinted, luminescent paint, comprising:
   a) an oil based resin,
   b) a plurality of pigments comprising at least one phosphorescent pigment which is an alkali earth oxide aluminate, and another of which is titanium dioxide,
   c) a colored tint, and
   d) a rheology modifier, which keeps phosphorescent pigment in suspension for a sufficient time to apply the paint, wherein the said rheology modifier includes a modified castor oil.

* * * * *